United States Patent [19]

Fresnel

[11] 4,118,916
[45] Oct. 10, 1978

[54] THERMOPLASTIC WRAPPING MACHINE

[75] Inventor: Jacques Fresnel, Paris, France

[73] Assignee: Sleever, Morangis, France

[21] Appl. No.: 768,748

[22] Filed: Feb. 15, 1977

[30] Foreign Application Priority Data

Feb. 24, 1976 [FR] France .............................. 76 05033

[51] Int. Cl.² ........................................... B65B 21/24
[52] U.S. Cl. ..................................... 53/292; 53/295
[58] Field of Search ................ 53/291, 292, 293, 294, 53/295

[56] References Cited

U.S. PATENT DOCUMENTS 2,103,302  12/1937  Strout ................................ 53/291 X
3,861,118  1/1975  Muto ................................. 53/292 X Primary Examiner—Travis S. McGehee
Attorney, Agent, or Firm—Browdy and Neimark

[57] ABSTRACT

The invention relates to a machine for automatic, rhythmic wrapping of heat-shrinkable sleeves around containers, from a hopper where the sleeves are stacked flat to a device for continuous shrinking of these sleeves.

The machine comprises in particular: means for extracting the sleeves one by one from the hopper, causing them to open very slightly; means for opening each sleeve substantially into a semicircle, then conveying it to a vertical plane above a conveyor for the containers to be wrapped; means enabling the sleeve to receive its final circular form, then to be placed gradually around the container to be wrapped.

Application to wrapping sections of preprinted or decorated shrinkable plastic sections of sheathing and bracelets around various containers such as bottles, food and aerosol cans, etc.

8 Claims, 9 Drawing Figures

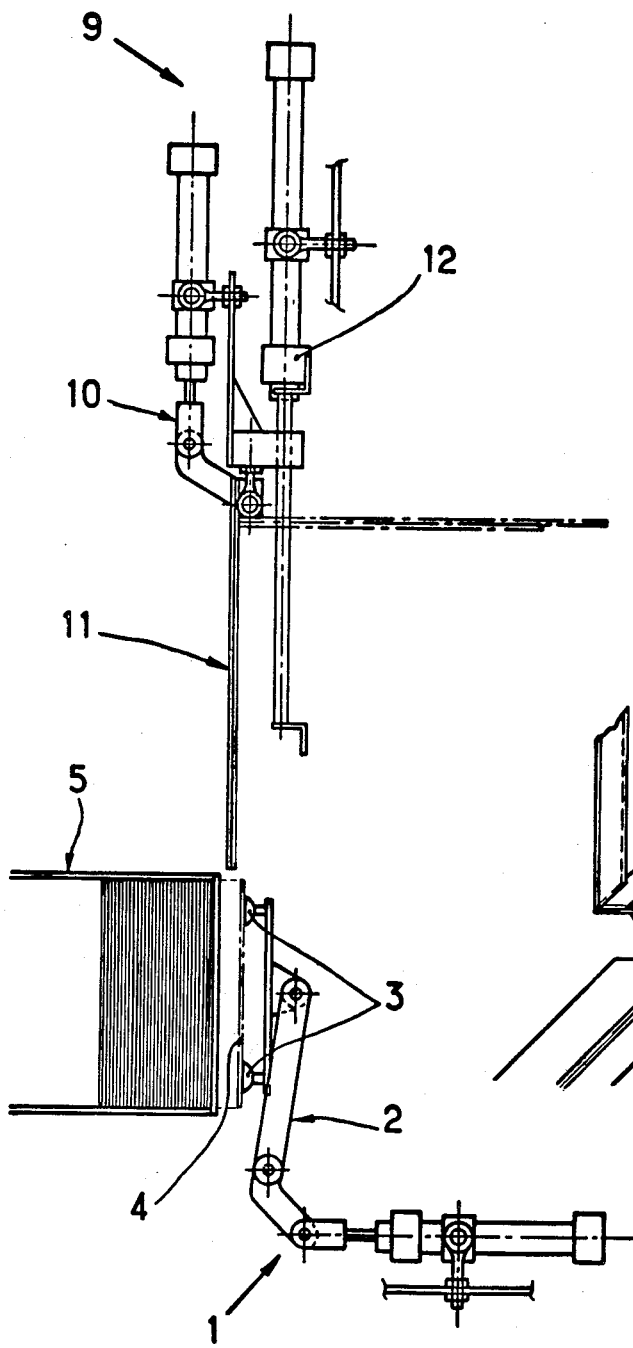
FIG:1
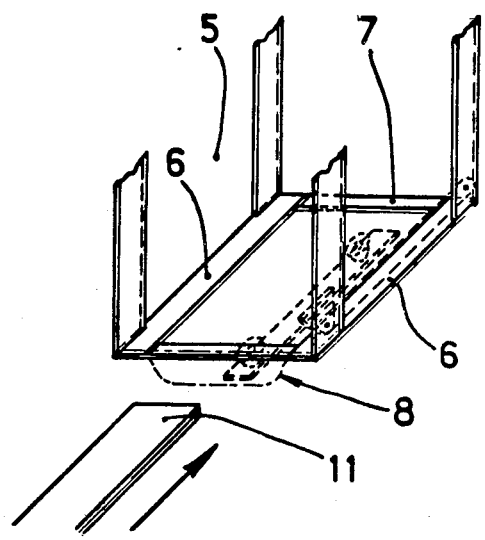
FIG:2

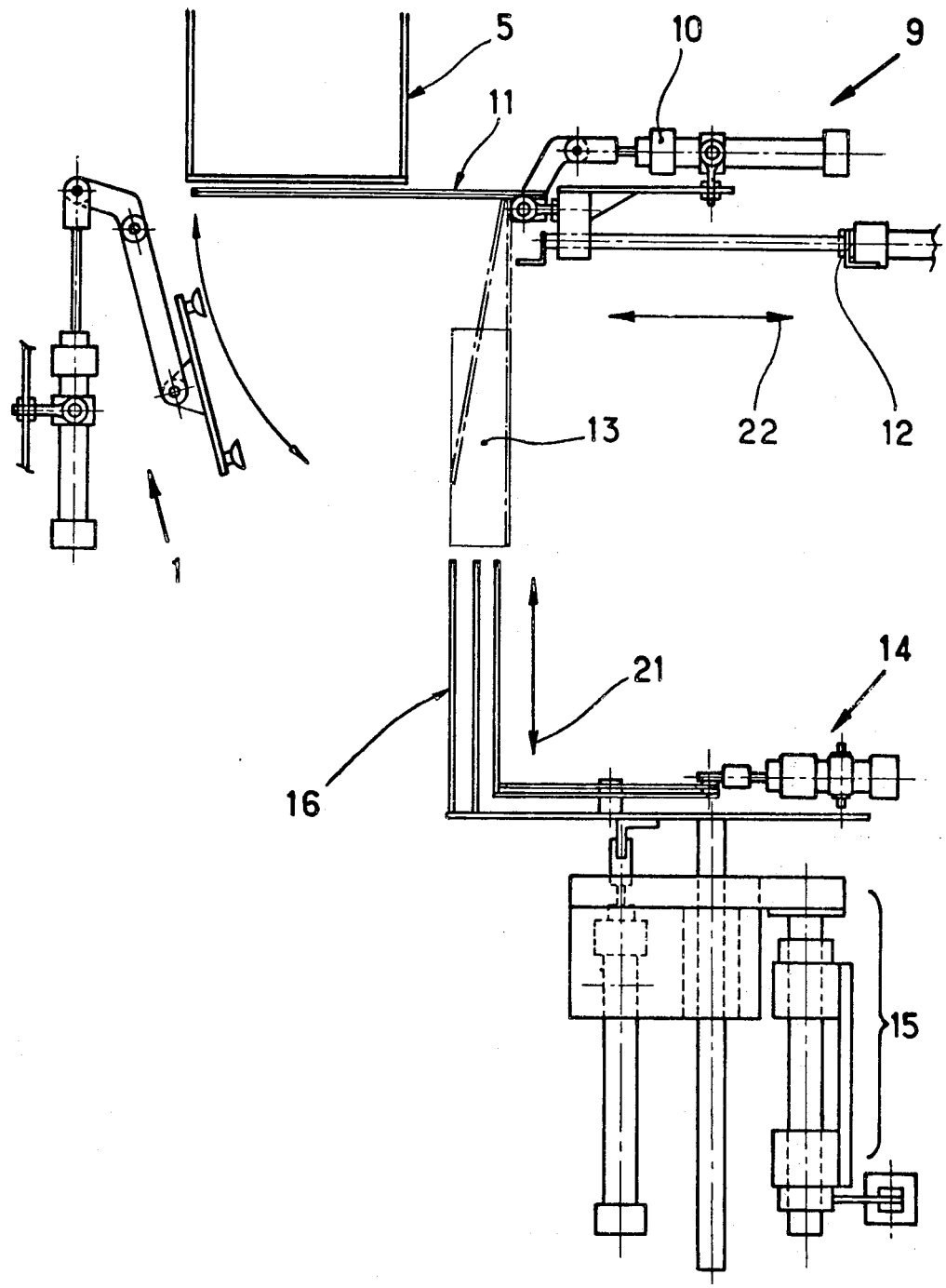
FIG:3

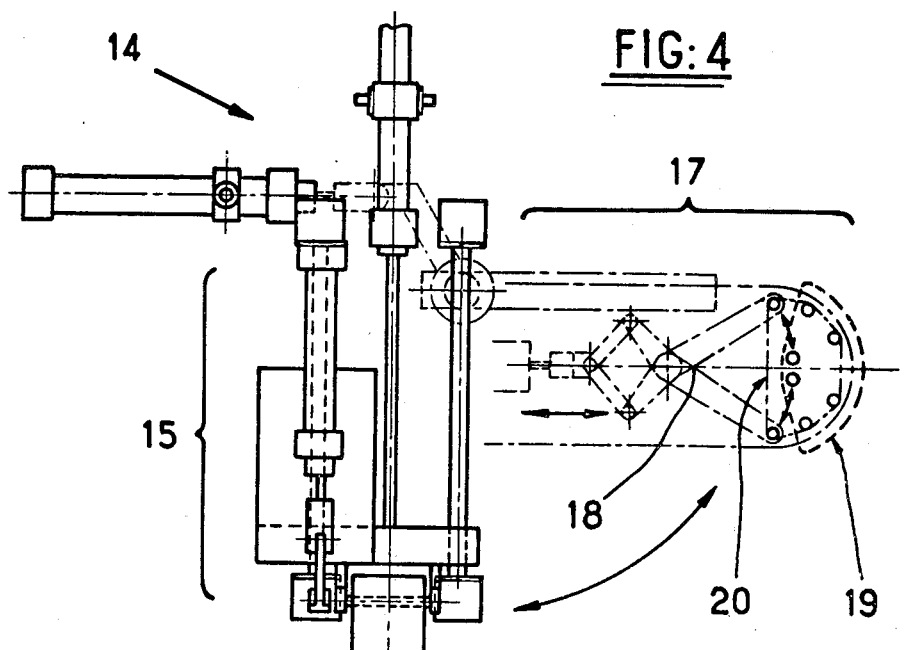
FIG: 4
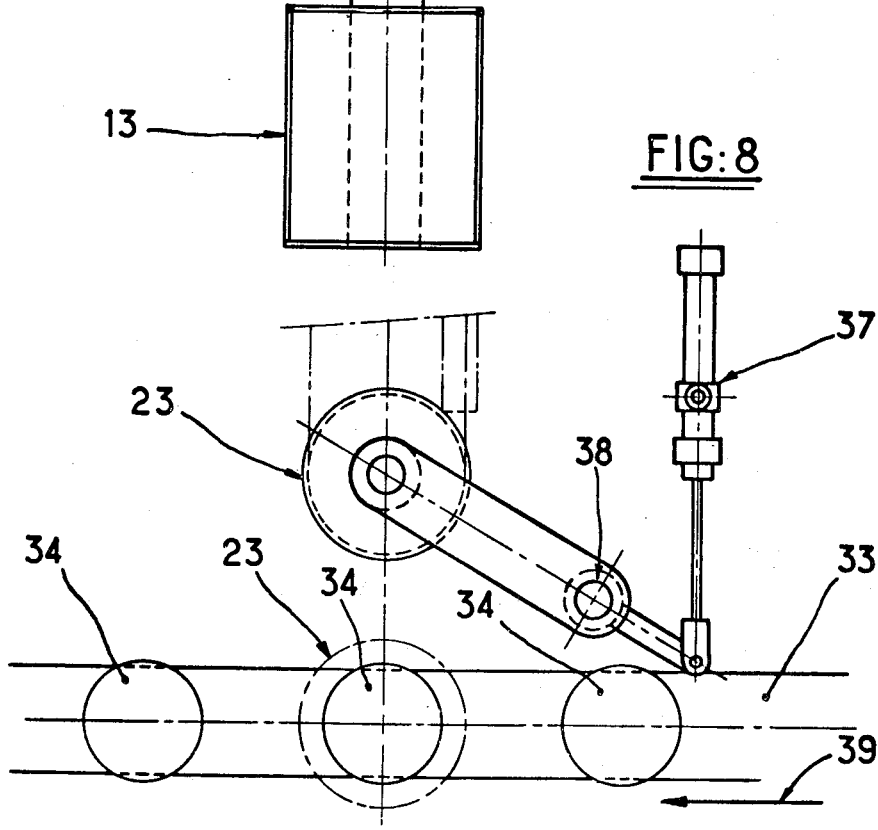
FIG: 8

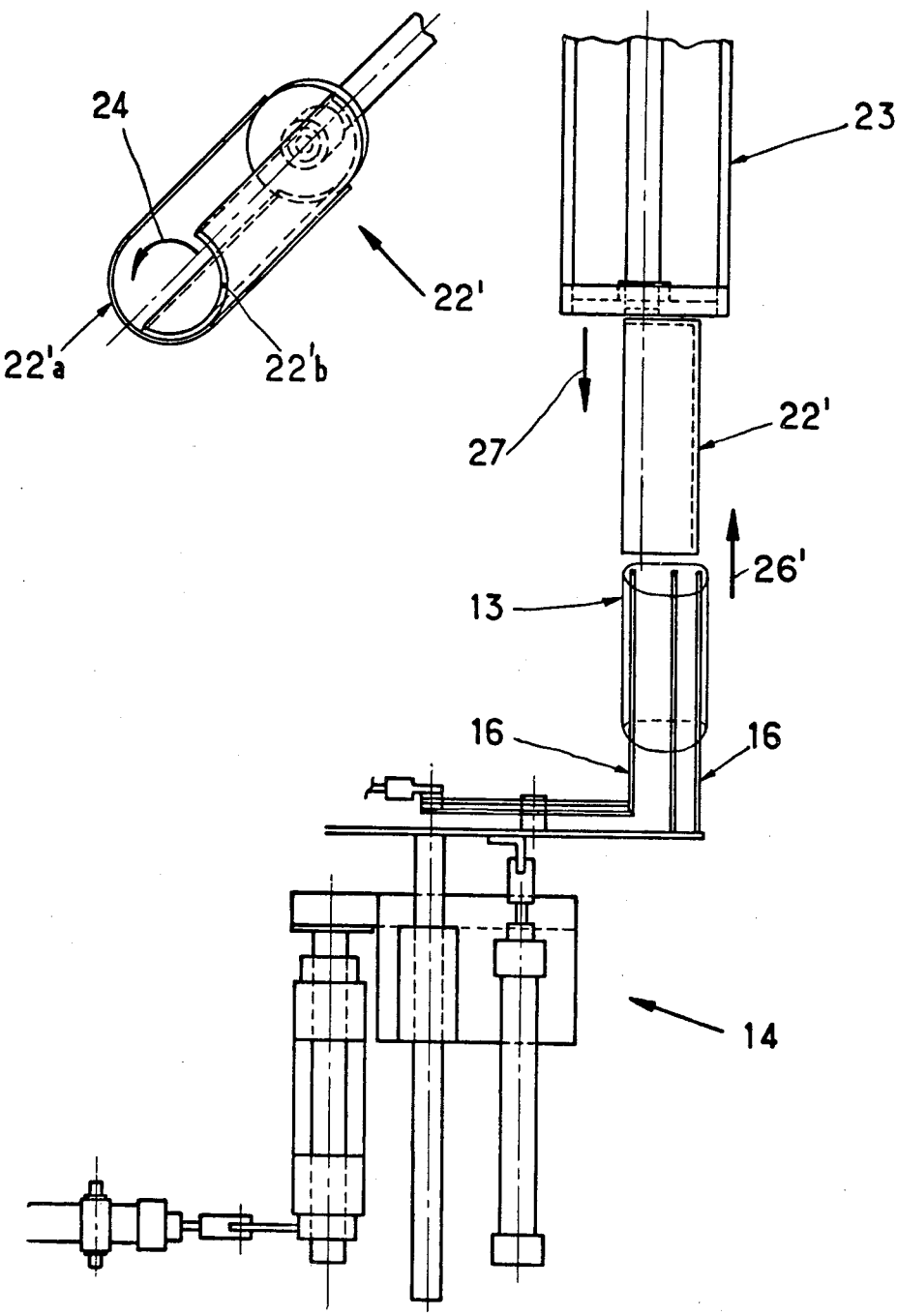

FIG: 9
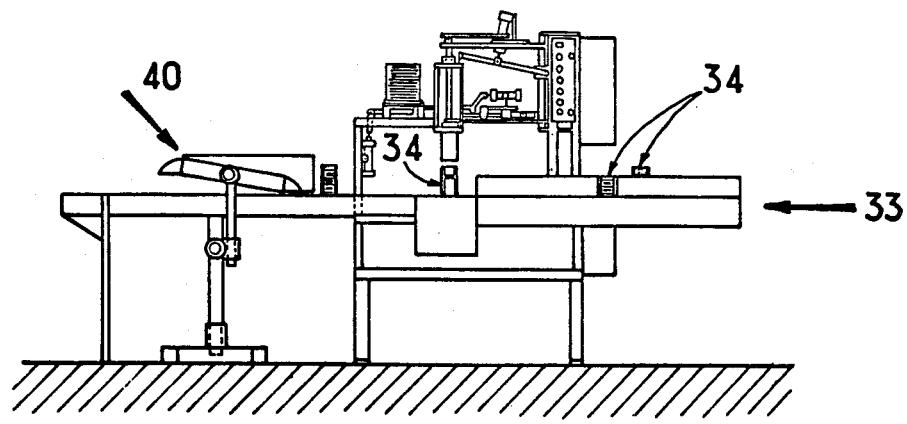
FIG: 7
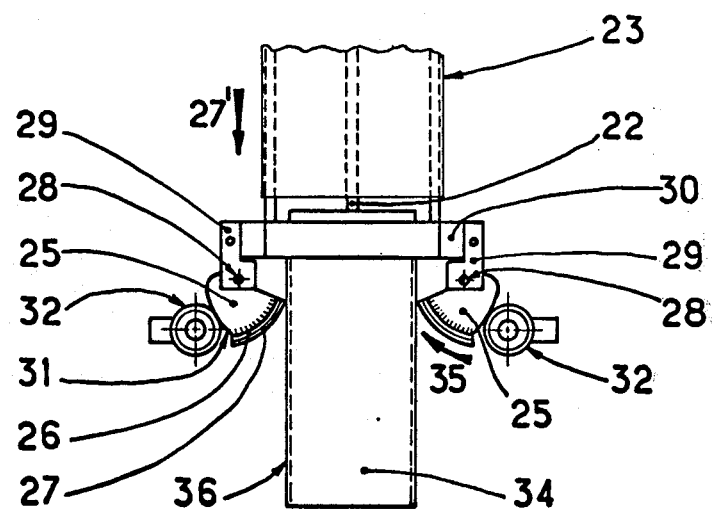

THERMOPLASTIC WRAPPING MACHINE

FIELD OF THE INVENTION

The present invention relates to devices for placing sections of thermoplastic sheathing around containers, beginning with a flat stack of these sleeves. It relates particularly to an automatic machine for slipping thermoplastic sleeves around containers, from a feed hopper wherein the sleeves, of appropriate size, are stacked flat up to a container conveyor where the packaging sleeves are continuously heat-shrunk.

DESCRIPTION OF THE PRIOR ART

It is now well known to provide containers such as bottles, aerosol cans, flasks and the like made of various materials with a protective and decorative sleeve or sheath made of shrinkable plastic. This sleeve is placed relatively loosely around the container and, after heating to cause the plastic to shrink on, it must exactly match the shape of the container. It is thus possible to make containers packaged in transparent thermoplastic material, generally printed, or with porous or foam plastic.

Numerous operating stages are necessary to pass from the thin plastic sheet, rendered heat-shrinkable by stretching, to the decoratively packaged container. These stages must be automated to attain appropriate industrial profitability. According to already known techniques the attempt has been made to operate in a single discontinuous or continuous cycle by causing the plastic sheet or strip to undergo the following successive operations: stretching, printing, winding onto a mandrel, sealing of overlapping edges, removal of the mandrel and sheath and sleeve extraction device, then conveyance thereof to the container to be packaged, finally the operation of heat-shrinking the segment of sheathing onto the container. The types of machines employed in this process are complex in structure and costly to build. In addition, they require many difficult adjustments and coordination of the operations as a whole is somewhat difficult to obtain.

According to a simpler method providing greater flexibility of adaptation to each type of container, sections of heat-shrinkable sheathing are made in advance from printed thermoplastic film cut and sealed to the appropriate dimensions. Thus, a stock of sleeves which can be stacked on top of one another and which are ready for packaging appropriate containers is available. This discontinuous process, however, is useful only insofar as the manufacturer has an automatic high-speed easily adjustable wrapping machine available.

SUMMARY OF THE INVENTION

The invention provides a solution to the difficult problem pf gradually opening the stacked heat-shrinkable sleeves, then conveying each sleeve and automatically positioning it above, then around, the body of the container to be packaged. For this purpose it proposes a machine with rhythmic operating phases, which can be inserted, without special adaptation, between the sleeve-making line and a conveyor on which the containers travel continuously. Once they have been packaged, the containers are subjected to heat shrinking in a tube furnace or the like.

The new machine according to the invention comprises essentially:

a. means for extracting the sleeves one by one from a hopper and causing them to open very slightly;

b. means for opening each sleeve into substantially a semicircle and then conveying it in a vertical plane above a conveyor of containers to be packaged;

c. means also situated in the vertical plane enabling the final circular shape to be placed on the sleeve, then for the sleeve to be gradually placed around the container to be packaged. All of these means are coordinated such that the successive stages of opening, conveyance, and placement of the sleeves fits into the time between the positions of two adjacent containers traveling on the conveyor.

According to one embodiment, the means designated under (a) above comprise a suction element of the suction cup type or the like which draws up the sleeve essentially at its center part while the latter is held around its entire periphery by strip-shaped elements surrounding the bottom of the feed hopper. For example, these elements can consist of two pairs of plates one of which, corresponding to the longer side of a sleeve, is wider than the other. Thus, when the element with suction cups (two of them for example) seizes the center zone of the sleeve, this sleeve opens very slightly because the edges are held back.

Means (b) comprise an assembly with two piston-and-cylinder units, one of which enables extracting claws to be introduced into the aforesaid small opening of the sleeve while the other causes the sleeve to turn through an angle of 90° in the vertical position; plus a conveyor device also provided with fingers the spacing of which enables an approximately semicircular shape to be placed upon the sleeve. This conveyor device is pivotably mounted on a support frame and the spacing between the fingers, by means of an appropriate linkage, varies between two successive positions. The first position places an ovoid shape on the sleeve while the second corresponds to a semicircular configuration thereof.

According to another embodiment of the invention, the means denoted by (c) comprise a mandrel composed of two semicircular half-shells one of which is movable with respect to the other to form a closed circle; and a hood designed to fit over the mandrel and having diametrically opposed selflocking jaws at its base. The jaws are designed to keep the lower part of the sleeve shut tight after it has been placed around the containers. The means (c) are designed to adjust exactly to the diameter and the top of the container to be packaged.

In practice, as will be seen from the description hereinbelow, the mandrel, the hood, and the conveyor means (b) are all movable with respect to each other and function automatically and in coordination.

BRIEF DESCRIPTION OF THE DRAWINGS

The invention will be better understood from a detailed description of the structure and function of the various elements of the machine provided as a nonlimitative illustration, and in its essential parts by the attached drawings wherein the following can be seen:

FIG. 1: a system for extracting, unit by unit, then pre-opening the sleeves from their feed hopper;

FIG. 2: detail of the base of the hopper wherein the sleeves are stacked;

FIG. 3: a schematic drawing of the device for half-opening the sleeve and the pivoting conveyor device at the time when the extracting system is in the retracted position;

FIG. 4: a partial plane view of FIG. 3 illustrating in particular the finger-spacing device for causing the sleeve to open to a semicircle;

FIG. 5: the conveyor device (after pivoting through a quarter of a turn from the position in FIG. 3) surmounted by the shell mandrel and a hood which fits over it (means designated by (b) and (c) above).

FIG. 6: detail of the mandrel, designed to cause the sleeve to open fully into a circle;

FIG. 7: the assembly for automatically tightening a sleeve onto a container with the aid of selflocking jaws;

FIG. 8: the position, as a projection on a plane, of the hood fitting over the mandrel in a phase intermediate between packaging of two adjacent containers traveling continuously on a conveyor;

FIG. 9: a general schematic view of a sleeve-wrapping machine according to the invention with its container conveyor.

DESCRIPTION OF THE PREFERRED EMBODIMENTS

Referring to FIG. 1, the suction element 1 whose articulated arm 2 is provided with a plate with two suction cups 3 has just extracted a flat sleeve 4 coming from feed hopper 5 where the printed sleeves or sheathing sections are stacked flat. As may be seen from FIG. 2, the bottom of hopper 5 is provided at its periphery with pairs of strip-shaped plates 6 and 7 which hold the edges of the sleeve when the latter is pulled by suction cups 3. Because of this, at the time of extraction, the sleeve opens very slightly along dashed line 8 of FIG. 2. Piston-and-cylinder assembly 9 then comes into action in two phases. In the first phase, piston-and-cylinder unit 12 pushes extracting claws 11 (two for example) into the small opening 8 of the sleeve. Then in the second phase piston-and-cylinder 10 causes the sleeve to turn through an angle of 90° to bring it into the vertical position 13 as may be seen in FIG. 3.

In the position corresponding to FIG. 3, piston-and-cylinder unit 12 as well as the suction or extraction element 1 are in the retracted position, waiting for vertical sleeve 13 to be handled by conveyor device 14. This device, also provided with piston-and-cylinder units (assembly 15) and pivotably mounted on the frame of the machine (not shown), has a series of fingers or blades 16 designed to penetrate sleeve 13. According to the invention, more clearly visible from part 17 of FIG. 4, these fingers have variable spacing because of a linkage 18 which, by opening and closing, enables blades 16 to be moved successively into two positions, namely: an intermediate position corresponding to dashed line 19 where the sleeve aperture is of the ovoid type, and then a second position where this opening has substantially the semicircular shape denoted 20. When this stage of opening is reached, device 14 retracts downward (point 21 of the arrow, FIG. 3) while the piston-and-cylinder assembly 9 returns (point 22 of the arrow, FIG. 3) and the suction element 1 resumes its position for extracting a new sleeve according to FIG. 1.

The next operating phase, the purpose of which is to cause full opening of the sleeve to form a circular mouth and placing it around the container to be packaged, is shown schematically in FIGS. 5 to 8. As shown in FIG. 5, conveyor device 14 has pivoted through a quarter of a turn with respect to its position in FIG. 3. Fingers 16 which hold sleeve 13 half open are situated under a mobile assembly comprising a mandrel 22' over which a hood 23 can be fitted. According to the invention, this mandrel, clearly visible in FIG. 6, is composed of two shells or segments 22'a and 22'b capable of closing in the direction of arrow 24 to form a circle which will enable the opening of sleeve 13 to be made perfectly round.

According to FIG. 7, a sleeve-gripping device is provided for at least part of the wrapping process, by means of two diametrically opposed selflocking jaws. Each jaw has an eccentric part 25 welded to a metal plate 26 with the same curvature as the long edge of the eccentric part and provided with a shoe 27 made of rubber or any other equivalent material. The jaw pivots around an axis 28 in a housing 29 connected to base ring 30 of mandrel 22' over which hood 23 descends. In addition, the sides 31 of the two jaws abut fixed rollers 32 connected by known means (not shown) to the device controlling hood 23.

As may be seen from FIG. 9, the vertical sleeve-wrapping machine according to the invention is installed above a conveyor 33 along which the containers 34 to be packaged travel continuously.

The functioning of the aforementioned elements according to FIGS. 5, 7 and 8 can be summarized as follows: fingers 16 of conveyor device 14 rise in the direction of arrow 26' along and around mandrel 22; hood 23 begins to move downward (arrow 27') causing by its movement rollers 32 to contact sides 31 of jaws 25. The latter then pivot upward (arrow 35 in FIG. 7), gradually exerting more and more pressure over a larger and larger surface of sleeve 36, tightening it around container 34 to be packaged. Because of this automatic tightening for at least part of the sleeve-wrapping operation, the sleeve perfectly matches the external contours of the container to be packaged. In practice, as may be seen from FIG. 8, the hood 23 is moved by a piston-and-cylinder assembly 37 and by the articulation on a shaft 38 placed at the level of conveyor 33 where containers 34 to be packaged travel continuously in the direction of arrow 39. When the hood 23 has placed the sleeve around the container, articulated system 37-38 returns to its initial position shown in FIG. 5.

Of course, each of the phases described hereinabove is coordinated and slightly staggered in time such that the sleeve-wrapping operation can occur exactly at the selected speed at which the containers travel past on the conveyor. Moreover, the assembly of elements and devices of which the machine according to the invention is comprised is mounted on an appropriate frame, as may be seen in FIG. 9, such as to constitute a homogeneous assembly installed on a continuous conveyor 33 for containers 34 which, after receiving their thermoplastic sleeves, are subjected to heat-shrinking in a hot-air blast device 40 installed on conveyor 33.

The new machine according to the invention as described hereinabove or according to variants by implementation of equivalent means can serve for high-speed wrapping of all types of sleeves or bands of heat-shrinkable plastic around containers of various shapes. It is particularly suitable for packaging containers such as bottles, aerosol cans, single- or double-walled food cans and other containers more or less complex in shape with plastic sleeves which have previously received any desired printing or decorations.

What is claimed is:

1. An automatic thermoplastic machine for wrapping thermoplastic sections of sheathing or sleeves around containers, from a feed hopper, where the sleeves, or appropriate size, are stacked flat, up to a continuous device for shrinking these sleeves, the machine comprising:
- opening means enabling the sleeves to be taken one by one from the hopper, at the same time slightly opening them;
- conveying means for opening each sleeve substantially to a semicircle, then conveying it to a vertical plane above a conveyor of containers to be wrapped, said conveying means comprising extracting claws, two piston-and-cylinder units, one of which enables said extracting claws to be introduced into the small opening of the sleeve while the other serves subsequently to pivot the sleeve through 90° to a vertical position and a conveyor device provided with fingers the spacing between which enables a semicircular shape to be placed upon the sleeve; and
- wrapping means also situated in said vertical plane enabling the sleeve to achieve its final circular shape and then be gradually wrapped around the container to be packaged;
- wherein wrapping is coordinated such that successive opening, conveying, and sleeve-wrapping fit timewise between positioning of two adjacent containers traveling on said conveyor.

2. Machine according to claim 1, wherein said opening means comprises a suction element, which attracts the sleeve substantially in its center part, and strip-shaped elements around the bottom of the feed hopper which hold the sleeve along its entire periphery while said suction element attracts the center part.

3. Machine according to claim 1, wherein said conveyor device is pivotably mounted on a support frame and the finger spacing is varied by means of a linkage between two successive positions, the first position placing an ovoid shape on the sleeve while the second position corresponds to the semicircular configuration of the sleeve.

4. Machine according to claim 1 which is mounted on a frame integral with a conveyor whereon the continuously traveling containers receive their packaging sleeves at a regular rate and are then subjected to heat-shrinking by passage through a hot-air blast device disposed on the conveyor.

5. Machine according to claim 1, wherein said suction element is of the suction cup type.

6. An automatic machine for wrapping heat-shrinkable thermoplastic sections of sheathing or sleeves around containers, from a feed hopper, where the sleeves, of appropriate size are stacked flat, up to a continuous device for shrinking these sleeves, the machine comprising:
- opening means enabling the sleeves to be taken one by one from the hopper, at the same time slightly opening them;
- conveying means for opening each sleeve substantially to a semicircle, them conveying it to a vertical plane above a conveyor of containers to be wrapped; and
- wrapping means also situated in said vertical plane enabling the sleeve to achieve its final circular shape and then be gradually wrapped around the container to be packaged, said wrapping means comprising a mandrel composed of two semicircular shells of which one is movable with respect to the other to form a closed circle, a hood to fit over said mandrel and two diametrically opposed self-flocking jaws at the base of said hood, said jaws being designed to grip the lower part of the sleeve after it has been placed around the container, and said wrapping means being provided to adjust exactly to the diameter of, and being disposed above, the container to be packaged;
- whereby wrapping is coordinated such that successive opening, conveying, and sleeve-wrapping fit timewise between positioning of two adjacent containers traveling on said conveyor.

7. Machine according to claim 6, wherein each said self-locking jaw is composed of an eccentrically shaped part whose pivoting and gradual automatic tightening around the container are initiated by contact with a fixed roller connected to the hood control device.

8. Machine according to claim 6, wherein said mandrel, said hood, and said conveying means are each movable and pivotable with respect to each other and are automatic in function, being coordinated with the rate of travel of the containers on the conveyor.

* * * * *